No. 663,416. Patented Dec. 11, 1900.
W. F. CLARK & H. D. BOGLE.
SEEDER ATTACHMENT FOR CULTIVATORS.
(Application filed Sept. 22, 1900.)
(No Model.) 2 Sheets—Sheet 1.
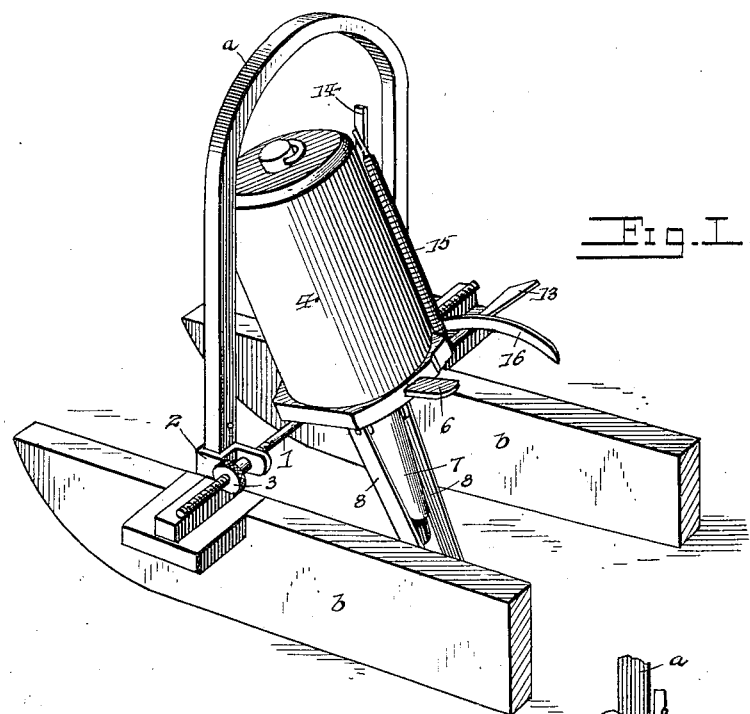
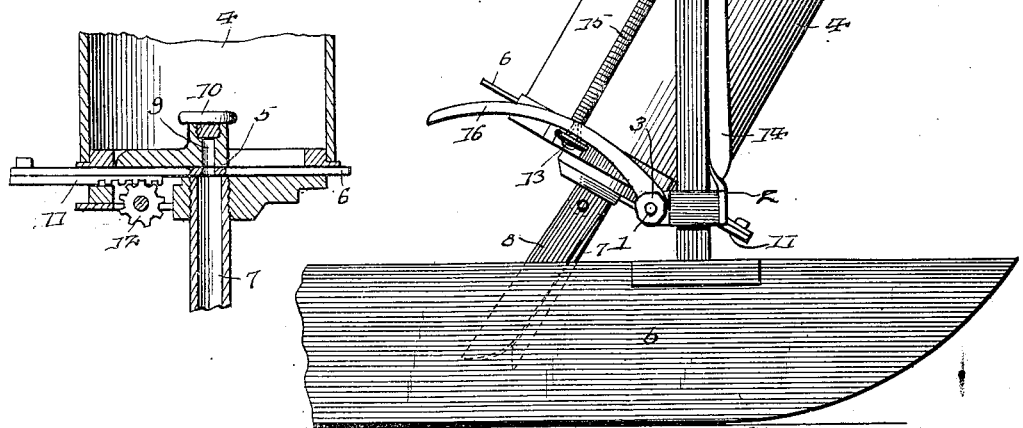

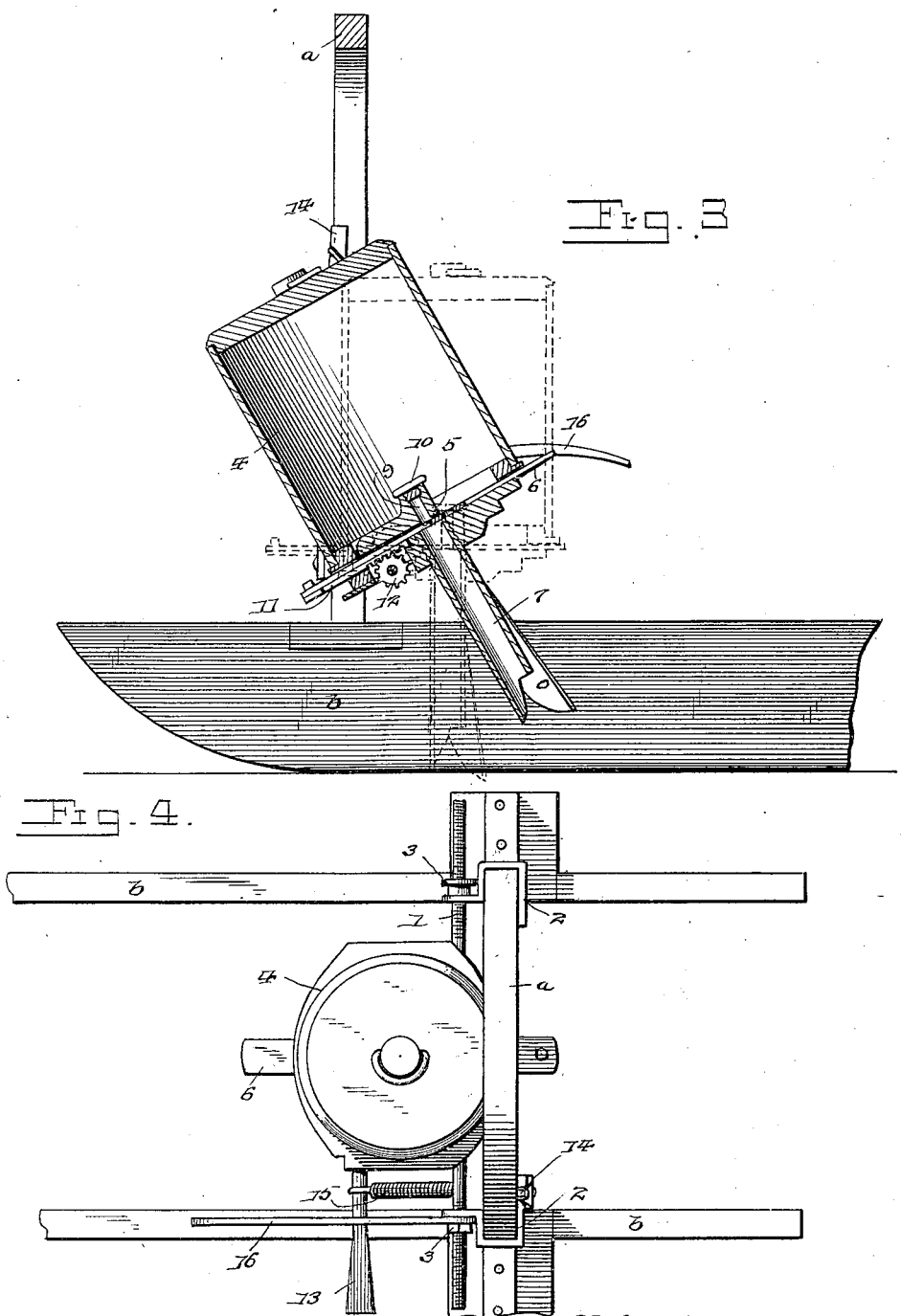

UNITED STATES PATENT OFFICE.

WILLIAM F. CLARK AND HARVEY D. BOGLE, OF LEON, KANSAS.

SEEDER ATTACHMENT FOR CULTIVATORS.

SPECIFICATION forming part of Letters Patent No. 663,416, dated December 11, 1900.

Application filed September 22, 1900. Serial No. 30,824. (No model.)

*To all whom it may concern:*

Be it known that we, WILLIAM F. CLARK and HARVEY D. BOGLE, citizens of the United States, residing at Leon, in the county of Butler and State of Kansas, have invented a new and useful Seeder Attachment for Cultivators, of which the following is a specification.

Our invention relates to an improvement in seeder attachments for cultivators especially adapted to be used to plant seeds in missing hills of corn while cultivating for the first or second time; and it consists in the peculiar construction and combination of devices hereinafter fully set forth, and pointed out in the claims.

In the accompanying drawings, Figure 1 is a perspective view of a seeder attachment embodying our improvements, showing the same connected operatively to the arch-bar connecting the runners of a lister-cultivator. Fig. 2 is a side elevation of the same. Fig. 3 is a sectional view of the same. Fig. 4 is a top plan view of the same. Fig. 5 is a detail sectional view of the coacting elements of the seeder attachment on a somewhat larger scale.

The form of our invention here shown is designed to be used in connection with any cultivator having an arch. The supporting-rod 1 is provided with keepers 2, which are adjustable on the ends thereof and are adapted to be secured on opposite sides of an arch—as, for instance, the arch *a*, which connects the runners *b* of a lister-cultivator. The ends of the supporting-rod which pass through the said keepers are screw-threaded and are provided with thumb-screws 3, by means of which the keepers may be adjusted on the said supporting-rod and clamped to the said arch-bar.

The seed box or hopper 4, which is cylindrical in form, is pivotally mounted on the supporting-rod and is adapted to rock or oscillate thereon, is provided with a cut-off 5, a reciprocating seed-slide 6, and from the bottom of the said seed-hopper depends a furrow-opening seed-spout 7, having a coverer 8 on its rear side. The length of the said seed-spout is such that when the seed-hopper is inclined forward in its normal position (shown in Figs. 1, 2, and 3) the lower end of said seed-spout is above and clear of the earth, but when the said seed-hopper is turned to a vertical position the lower end of the seed-spout enters the earth to a depth of a few inches below the surface, so that the seeds will be planted at an appropriate depth.

In the form of our invention here shown the cut-off plate 5 is provided with an opening 9, which is coincident with the bore of the seed-spout and is provided with a plug or closure 10. The seed-slide is provided on its lower side with the rack-bar 11, and on the supporting-rod, which is non-revoluble, is secured a pinion 12, which engages the said rack-bar. Hence when the seed-hopper is rocked or oscillated on the said supporting-rod the seed-slide is actuated, as will be understood, and seeds are dropped by the seed-dropping mechanism whenever the hopper is moved to a vertical position.

A pedal 13 projects from one side of the base of the seed-hopper. A standard 14 rises from one of the keepers 2, and a coiled extensile spring is attached near the upper end of the said standard, the lower end of said coiled extensile spring, which is designated by the numeral 15, being attached to the pedal 13. The function of the said spring, as will be understood, is to normally tilt or incline the seed-hopper forward on the supporting-rod. The said keeper which is provided with the standard 14 is further provided with a rearward-extending curved stop-arm 16, which is engaged by the pedal 13 on one stroke of the seed-hopper, said stop-arm and said pedal coacting to normally maintain the hopper in the initial position. (Shown in Figs. 1, 2, and 3 of the drawings.) The hopper may be depressed by means of the pedal at any point where there is a missing hill of corn in order to replant the same.

While our improved seeding attachment is specially designed for use in replanting missing hills of corn, we do not limit ourselves to the use thereof in this connection.

Having thus described our invention, we claim—

1. In a planter, the combination of a support, a seed-hopper pivoted thereon, means to rock said hopper on said support, a seed-slide in said hopper, and a gear actuated by the rocking movement of said hopper, to actuate said slide, substantially as described.

2. In a planter, the combination of a support, a seed-hopper pivoted thereon, and having a pedal, whereby said hopper may be turned on said support in one direction, a spring to move said hopper in the reverse direction, and a seed-dropping mechanism, actuated by the rocking movement of said hopper, substantially as described.

3. In a planter attachment for cultivators, the combination of a supporting-rod, actuating devices on said rod, a seed-hopper pivotally mounted on said supporting-rod and adapted to oscillate or rock thereon, a pedal and spring to rock said hopper, a seed-dropping mechanism, actuated by the rocking motion of the hopper, and a furrow-opener and covering devices attached to said hopper and participating in the rocking motion thereof, substantially as described.

4. In a planter, the combination of a support, a seed-hopper pivotally mounted thereon, a pinion on said support, a seed-slide in said hopper having a rack engaged by said pinion and means to rock said hopper, substantially as described.

In testimony that we claim the foregoing as our own we have hereto affixed our signatures in the presence of two witnesses.

WILLIAM F. CLARK.
HARVEY D. BOGLE.

Witnesses:
C. A. LELAND,
W. F. BENSON.